United States Patent Office 3,544,380
Patented Dec. 1, 1970

3,544,380
METHOD OF ACTIVATING FUEL CELL ELECTRODE BY DIRECT CURRENT
Arabinda N. Dey, Arlington, Mass., assignor to Hooker Chemical Corporation, Niagara Falls, N.Y., a corporation of New York
No Drawing. Filed Apr. 21, 1967, Ser. No. 632,551
Int. Cl. H01m 27/00
U.S. Cl. 136—86                                    4 Claims

ABSTRACT OF THE DISCLOSURE

The activity of the fuel electrode in a fuel cell is increased by periodic application for a short time, of a superimposed direct current in the same direction as the normal current.

BACKGROUND OF INVENTION

This invention relates to fuel cells and more particularly to an improvement in fuel cells which employ acidic aqueous electrolyte.

Fuel cells are devices for converting chemical energy into electrical energy by electrochemical reactions at the cell electrodes causing a flow of electrons in conductors, resistances and other electrical devices connected between the cell electrodes. In the cells to which the present invention pertains, aqueous acidic electrolytes are used, and oxidizing material, usually oxygen or air, is fed to the cathode which is known as the oxidizing electrode and a liquid or gaseous oxidizable material is fed to the anode which is known as the fuel electrode. Each of the two electrodes surrounded by its electrolyte may be considered as a half cell, the juncture of the two half cells forming a complete fuel cell. The two electrolytes, that is the catholyte and the anolyte, may be substantially the same or different chemical materials in aqueous solution. The cell is so constructed with diaphragms, partitions or other devices so as to keep the oxidizing material fed to the cathode from coming in contact with the anode and likewise to prevent the oxidizable material fed to the anode from coming in contact with the cathode. For this purpose, it is generally preferred to have some sort of diaphragm between the anode and cathode parts of the cell. Such diaphragms may be semi-permeable type or the ion-exchange type; or, in some cases, it may be sufficient to have partitions or weirs that prevent gases from moving from the cathode to anode and vice versa. The oxidizing anode utilizing oxygen or air commonly is composed of porous carbon coated or impregnated with catalytic material and the oxidizing gas fed so as to pass through the porous carbon and into contact with the electrolyte and the catalyst. The same type of electrode may be used for the anode when the oxidizable material is gaseous. When the oxidizable material is a liquid, substantially insoluble in electrolyte, the same type of electrode may be used or other means may be employed to bring the liquid electrolytic oxidizable material in contact with the electrolyte and catalytic material on the face of the elecrode. When he oxidizable material is soluble in the aqueous electrolyte, porosity of the electrode is of minor importance and substantially any conductive surface inert in the liquid electrolyte may be utilized.

Such cells are commonly operated at temperatures from around room temperature to higher temperatures, but below the boiling point of the electrolyte.

It has been proposed to superimpose a reverse direct current on a fuel cell having a metallic fuel electrode so as to depolarize and activate the latter by electrolytic reduction. In practicing this method with porous electrodes, it is important that the potential applied should not be increased beyond the hydrogen evolution potential, otherwise damage may occur to the interior structure of the porous electrode. In such methods of reactivation, it is of course necessary to interrupt the normal cell operation in order to apply the reverse current.

DESCRIPTION OF THE INVENTION

I have found that the fuel electrode of a fuel cell can be reactivated by the application of a superimposed direct current flowing for a short time in the same direction as the normal fuel cell direct current. The superimposed direct current may be applied by connecting it to the cell electrodes, either in parallel to whatever resistance is in the operating cell circuit or in series therewith. Generally, I prefer to connect it in parallel with such resistance. Alternatively, I may pass the superimposed current between the fuel electrode and an electrode other than the oxidizer electrode, which other electrode may be mounted in either the anolyte or catholyte of the cell.

The strength, duration and frequency of application of the superimposed direct current may vary widely, depending on the nature of the fuel cell and the fuel electrode, the cell electrolyte and the age of the cell. The current density of the superimposed current, with respect to the surface of the fuel electrode exposed to the electrolyte, may vary from 0.01 to 100 milliamperes per square centimeter; generally, I prefer a current density of 1 to 50 milliamperes per square centimeter. The duration of the superimposed current may be from about 0.05 second to around 5 minutes, or until the desired improvement is shown by measurement of the open circuit cell voltage. The frequency of application also may vary widely, from once every day or so up to pulsations of around 60 times per second. For example, pulsations of current lasting 15 to 60 seconds, applied 1 to 60 times per hour may be utilized. In one modification, I superimpose an alternating current on the direct current so as to give peak currents in the direction of the direct current, at regular intervals.

The effect of my activation method is to decrease the open circuit potential of the fuel cell electrode as measured with reference to a standard calomel electrode. The open circuit or rest potential of the other electrode is substantially unaffected by the method. The result is that the open circuit potential of the cell, or the potential difference between the two electrodes, is markedly increased, usually 50 percent or more, thus improving the efficiency of the cell.

My activation process may be employed without interrupting the operation of the fuel cell in its normal service. Any fluctuation or pulsation of the current delivered by the cell caused by operation of the activation procedure is immaterial in many uses for a fuel cell.

My invention is further illustrated by the following examples.

Example 1

An experimental fuel cell was operated, employing a 10 perecnt solution of phosphoric acid as electrolyte, having two electrode chambers separated by a wool felt diaphragm, feeding oxygen to the oxidizer electrode chamber and octane to the fuel electrode chamber. The octane floated on the surface of the electrolyte. The fuel electrode was a "paper electrode" supported on a tantalum wire screen. The "paper electrode" was a paper-like sheet, made by depositing particles of platinum black on polyacrylonitrile fibers and matting the fibers together to form a paper. It contained 2 mg. of platinum per cm.$^2$. The fuel electrode extended from the octane layer into the aqueous electrolyte. The oxidizer electrode was platinum gauze. The electrolyte was maintained at a temperature of about 100 degrees centigrade.

The open circuit voltage of the cell was found to be 0.38 volt; and the rest potential of the fuel electrode, with reference to a standard calomel cell, was 0.32 volt.

The operating cell was then subjected to two pulsations of superimposed direct current, connected in series with the cell and its external resistance, flowing in the same direction as the current delivered by the cell. Each pulsation was equivalent to a current density of 10 milliamperes per square centimeter on the fuel electrode surface exposed to the electrolyte. Each pulsation lasted for 30 seconds, and the time from the beginning of the first pulsation to the beginning of the second one was 10 minutes.

After the pulsations of direct current, the rest potential of the fuel electrode, with reference to the standard calomel cell, had decreased to 0.17 volt, and the open circuit voltage of the cell had increased to 0.53 volt.

Example 2

In a fuel cell like that of Example 1, except that the fuel electrode was made of a mixture of platinum black and Teflon® polytetrafluoroethylene supported on platinum gauze, the rest potential of the oxygen electrode, with respect to a standard calomel cell, was 0.70 volt, that of the fuel electrode was 0.16 volt, and the open circuit voltage of the cell was 0.54 volt.

A direct current of 10 milliamperes per cm.$^2$ on the fuel electrode, flowing in the same direction as the current delivered by the cell, was superimposed for 30 seconds. At this point, the rest potential of the fuel electrode was found to have decreased to 0.07 volt, that of the oxygen electrode remained at 0.70, and the open circuit of the cell had increased to 0.63 volt. The above-described superimposition of the direct current then was repeated twice, resulting in a fuel cell rest potential of −0.01 volt, while the open circuit voltage of the cell increased to 0.81 volt.

What is claimed is:

1. A method for activating a fuel cell electrode in a fuel cell including a fuel electrode, electrolyte, and oxidant electrode which comprises superimposing on said fuel electrode a direct current flowing in the normal cell current direction at a current density of about 0.01 to 100 milliamperes per square centimeter in pulsations of about 15 to 60 seconds applied from 1 to 60 times per hour.

2. The method of claim 1 in which said fuel cell utilizes oxygen as oxidizer and carbonaceous material as fuel, and said direct current is applied at a current density of 1 to 50 milliamperes per square centimeter.

3. The method according to claim 1 in which said direct current is superimposed on both the fuel and oxidizer electrodes.

4. The process according to claim 1 wherein the fuel is a liquid hydrocarbon and the fuel electrode comprises a platinum metal as catalyst.

References Cited

UNITED STATES PATENTS

| | | | |
|---|---|---|---|
| 3,134,697 | 5/1964 | Niedrach | 136—86 |
| 3,188,241 | 6/1965 | Weiss et al. | 136—86 |
| 3,207,682 | 9/1965 | Oswim et al. | 136—86 X |
| 3,266,937 | 8/1966 | Lyons | 136—86 |
| 3,300,345 | 1/1967 | Lyons | 136—86 |
| 3,220,887 | 11/1965 | DeLahunt | 136—86 X |
| 3,436,271 | 4/1969 | Cole et al. | 136—86 |

ALLEN B. CURTIS, Primary Examiner